(12) United States Patent
Dave et al.

(10) Patent No.: US 11,769,144 B2
(45) Date of Patent: Sep. 26, 2023

(54) PROVISIONING CREDENTIALS FOR AN ELECTRONIC TRANSACTION ON AN ELECTRONIC DEVICE

(71) Applicant: Apple Inc., Cupertino, CA (US)

(72) Inventors: Pritesh M. Dave, Fremont, CA (US); Shawn T. Webster, Sunnyvale, CA (US)

(73) Assignee: Apple Inc.

( * ) Notice: Subject to any disclaimer, the term of this patent is extended or adjusted under 35 U.S.C. 154(b) by 300 days.

(21) Appl. No.: 15/995,542

(22) Filed: Jun. 1, 2018

(65) Prior Publication Data
US 2018/0349890 A1    Dec. 6, 2018

Related U.S. Application Data

(60) Provisional application No. 62/514,678, filed on Jun. 2, 2017.

(51) Int. Cl.
*G06Q 20/36*    (2012.01)
*G06Q 20/40*    (2012.01)

(52) U.S. Cl.
CPC ..... *G06Q 20/3674* (2013.01); *G06Q 20/3672* (2013.01); *G06Q 20/4014* (2013.01)

(58) Field of Classification Search
CPC .... G06Q 20/322; G06Q 20/385; G06Q 40/02; G06Q 30/06; G06Q 20/4037; G06Q 20/12; G06Q 20/0562; G06Q 20/102; G06Q 20/24; G06Q 30/0633; G06Q 20/40; G06Q 20/3674; G06Q 20/3672; G06Q 20/4014; G06F 21/35; H04L 63/0815; H04L 63/20;

(Continued)

(56) References Cited

U.S. PATENT DOCUMENTS 5,634,122 A *  5/1997  Loucks .................... G06F 9/52
7,318,234 B1 *  1/2008  Dharmarajan ...... H04L 63/0846
                                                          370/352

(Continued)

FOREIGN PATENT DOCUMENTS

EP    3712792 A1 *    9/2020    ............. G06F 21/31

OTHER PUBLICATIONS

White, "How Computers Work", 2003, Que Publishing, 7th Ed., p. 4 (Year: 2003).

(Continued)

*Primary Examiner* — Courtney P Jones
(74) *Attorney, Agent, or Firm* — DICKINSON WRIGHT RLLP (57) ABSTRACT

This application relates to electronic devices, and other systems, methods, and processes for conducting electronic transactions. The electronic transactions may involve a vendor transaction platform and a credential provisioning application. The credential provisioning application, when determined to be compatible with the vendor transaction platform, may prompt for input of a credential to be provisioned during the electronic transaction. The vendor transaction platform is kept active or otherwise prevented from performing a time-out operation while the provisioning is conducted. The provisioned credential may be submitted as payment to complete the electronic transaction and may be stored on the electronic device for use in a subsequent electronic transaction.

20 Claims, 6 Drawing Sheets

(58) Field of Classification Search
CPC ..... H04L 37/42; H04L 63/0876; H04L 67/10; H04L 63/0281
USPC .......................................................... 705/67
See application file for complete search history.

(56) References Cited

U.S. PATENT DOCUMENTS

| | | | | |
|---|---|---|---|---|
| 8,181,028 | B1* | 5/2012 | Hernacki | G06Q 20/3829 713/182 |
| 9,723,003 | B1 | 8/2017 | Mcclintock et al. | |
| 9,836,740 | B1* | 12/2017 | Geist | G06Q 20/3278 |
| 2003/0018785 | A1* | 1/2003 | Eshel | H04L 12/417 709/226 |
| 2006/0230437 | A1 | 10/2006 | Alexander Boyer et al. | |
| 2009/0063345 | A1* | 3/2009 | Erikson | G06Q 20/102 705/44 |
| 2009/0164681 | A1* | 6/2009 | Elhamias | G06F 13/385 710/117 |
| 2010/0325544 | A1* | 12/2010 | Alhadeff | G06Q 30/02 715/716 |
| 2012/0239936 | A1 | 9/2012 | Holtmanns et al. | |
| 2013/0030985 | A1* | 1/2013 | Shebesta | G06Q 40/02 705/38 |
| 2013/0041830 | A1 | 2/2013 | Singh et al. | |
| 2014/0019367 | A1 | 1/2014 | Khan et al. | |
| 2014/0026200 | A1 | 1/2014 | Ekberg et al. | |
| 2014/0076965 | A1* | 3/2014 | Becorest | G06Q 20/342 235/380 |
| 2014/0121789 | A1* | 5/2014 | Brandes | G05B 23/027 700/80 |
| 2014/0164241 | A1* | 6/2014 | Neuwirth | G06Q 20/12 705/44 |
| 2014/0324692 | A1* | 10/2014 | Yarbrough | G06Q 20/3267 705/42 |
| 2015/0046339 | A1* | 2/2015 | Wong | G06Q 20/382 705/44 |
| 2015/0095238 | A1* | 4/2015 | Khan | G06Q 20/382 705/71 |
| 2015/0100788 | A1 | 4/2015 | Chastain et al. | |
| 2015/0254699 | A1* | 9/2015 | Bondesen | G06Q 20/385 705/14.17 |
| 2015/0339663 | A1* | 11/2015 | Lopreiato | G06Q 20/385 705/69 |
| 2015/0348007 | A1 | 12/2015 | Khan et al. | |
| 2015/0348025 | A1 | 12/2015 | Brown et al. | |
| 2015/0350177 | A1 | 12/2015 | Sharp et al. | |
| 2016/0119296 | A1* | 4/2016 | Laxminarayanan | H04L 9/14 713/168 |
| 2016/0173483 | A1* | 6/2016 | Wong | H04W 12/06 726/9 |
| 2016/0191494 | A1* | 6/2016 | Claes | H04L 63/0853 713/159 |
| 2016/0259464 | A1* | 9/2016 | Chan | G06F 3/0481 |
| 2017/0103229 | A1* | 4/2017 | Gellas | G06F 21/78 |
| 2017/0193497 | A1* | 7/2017 | Macedo | G06Q 20/3572 |
| 2017/0200152 | A1* | 7/2017 | Winkler | G06Q 20/321 |
| 2017/0221047 | A1* | 8/2017 | Veerasangappa Kadi | G06Q 20/352 |
| 2017/0270517 | A1 | 9/2017 | Vasu et al. | |
| 2017/0278096 | A1* | 9/2017 | Chitalia | G06Q 20/40145 |
| 2017/0278174 | A1* | 9/2017 | Harrell | G06Q 30/0643 |
| 2017/0323291 | A1* | 11/2017 | Donga | G06Q 20/3552 |
| 2017/0352095 | A1* | 12/2017 | Jurss | H04L 63/102 |
| 2017/0357965 | A1* | 12/2017 | Knopp | G06Q 20/385 |
| 2017/0357976 | A1* | 12/2017 | Malik | H04L 63/0807 |
| 2017/0373852 | A1* | 12/2017 | Cassin | H04L 63/062 |
| 2018/0005227 | A1* | 1/2018 | Sandelov | G06Q 20/3415 |
| 2018/0068293 | A1* | 3/2018 | Dunne | G06Q 20/3223 |
| 2018/0349904 | A1 | 12/2018 | Dave et al. | |

OTHER PUBLICATIONS

Kostiainen et al., Towards User-Friendly Credential Transfer on Open Credential Platforms, 2011, In: Lopez J., Tsudik G. (eds) Applied Cryptography and Network Security. ACNS 2011. Lecture Notes in Computer Science, vol. 6715. Springer, Berlin, Heidelberg. p. 395-412 (Year: 2011).

* cited by examiner

404 — PROCEED TO PAYMENT SUBMISSION OPERATION

502 — DETERMINE WHETHER VENDOR TRANSACTION PLATFORM IS COMPATIBLE WITH CREDENTIAL PROVISIONING APPLICATION

504 — WHEN COMPATIBLE, IDENTIFY ANY PREVIOUSLY PROVISIONED CREDENTIALS AVAILABLE FOR USE IN THE TRANSACTION

506 — WHEN NO CREDENTIALS ARE PREVIOUSLY PROVISIONED, PROMPT FOR IDENTIFICATION OF AND/OR INPUT OF A CREDENTIAL FOR PROVISIONING

508 — PROVISION THE IDENTIFIED/INPUT CREDENTIAL

510 — SUBMIT NEWLY PROVISIONED CREDENTIAL FOR COMPLETION OF THE TRANSACTION

512 — STORE NEWLY PROVISIONED CREDENTIAL FOR USE IN SUBSEQUENT ELECTRONIC TRANSACTION

PROVISIONING CREDENTIALS FOR AN ELECTRONIC TRANSACTION ON AN ELECTRONIC DEVICE

CROSS-REFERENCE TO RELATED APPLICATIONS

The present application claims the benefit of U.S. Provisional Application No. 62/514,678, entitled "PROVISIONING CREDENTIALS FOR AN ELECTRONIC TRANSACTION ON AN ELECTRONIC DEVICE," filed Jun. 2, 2017, the content of which is incorporated herein by reference in its entirety for all purposes.

FIELD

The described embodiments relate to provisioning and authentication of credentials on an electronic device, including provisioning a credential during an electronic transaction.

BACKGROUND

Recent advances in portable computing allow for electronic transactions to be conducted on electronic devices wirelessly interacting with transaction platforms, such as via websites, applications, and the like. Such transactions typically commence with communication or exchange of secured data that includes payment information. As the number of electronic transactions increases and the types of transaction platforms continue to vary, the security requirements for transmission and exchange of secured data in electronic transactions become more complex, as do requirements for storage of payment information for use in electronic transactions. While these requirements may improve security of electronic transactions, compliance with such requirements can complicate user interaction and frustrate a user's experience.

Therefore, what is desired is improved interfacing and application interaction of electronic devices for conducting electronic transactions across various transaction platforms, along with improved ways of storing payment information, thereby increasing the ease of engagement in electronic transactions for users of electronic devices.

SUMMARY

This disclosure describes various embodiments that relate to electronic devices for conducting electronic transactions (e.g., payment transactions). For example, electronic transactions can be conducted through a web browser, such as through a web page, and/or through an application, such as an in-app purchase through a specific vendor application. The electronic devices may access vendor transaction platforms (VTPs), such as via a VTP application on the electronic device or via a web site, for conducting electronic transactions. The electronic devices may also include credential provisioning applications (CPAs) that provision credentials for storage, ease of use, and security purposes to engage in electronic transactions.

In some implementations, an electronic device may determine whether a VTP is compatible with a particular CPA resident on or associated with the electronic device, and in response to this determination, a prompt for input of a credential (e.g., a payment credential), to be provisioned to the electronic device during a transaction, may be provided such that the credential may be provisioned to the electronic device during the transaction and used to complete the transaction. Provisioning of a credential for use in completing an electronic (e.g., in-app or web-based) transaction can be seamlessly integrated into the transaction flow, such as by including one or more provisioning screens into the transaction flow, while retaining the transaction-related information. The determination is conducted and the prompt is provided such that the VTP remains running or at least is prevented from performing a time-out operation while the provisioning of the credential occurs.

Once the credential is provisioned, the provisioned credential may be used to complete the transaction and may also be stored in the electronic device (or in an external storage accessible by the electronic device) for use in a subsequent electronic transaction. In some implementations, the provisioned credential may be stored even when the issuer of the credential is not accepted by the VTP, the provisioned credential is not used to complete or fully complete the electronic transaction, and the like.

Other aspects and advantages of the subject disclosure will become apparent from the following detailed description taken in conjunction with the accompanying drawings which illustrate, by way of example, the principles of the described embodiments. This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, where like reference numerals designate like structural elements.

DETAILED DESCRIPTION

Representative applications of methods and apparatus according to the present application are described in this section. These examples are being provided solely to add context and to aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Systems, methods, devices, processes, etc., are provided to obtain or receive a credential (e.g., a payment credential), for use in one or more electronic transactions. Further, a credential can be seamlessly provisioned in the transaction flow, after a transaction has been initiated, without loss of information relating to the transaction. For example, electronic payment can be selected during a transaction flow, such as check-out during a web-based or in-app transaction. If a suitable credential is not available to complete the transaction, a credential can be provisioned as part of the transaction flow. The credential may be provisioned with a credential provisioning application (CPA) such that they may be stored by an electronic device for ease of use and for recall in subsequent electronic transactions. The electronic devices may include, installed and/or stored thereon, a transaction platform application that accesses a vendor transaction platform (VTP) and a credential provisioning application (CPA) that provisions credentials through external security components, such via as a CPA broker or financial institution.

CPAs, however, typically permit use of previously provisioned credential information and, during access by an electronic device to a VTP for a transaction, it may be difficult to provision new credential information to the electronic device through the CPA. In some instances, a user of an electronic device conducting electronic transactions may not be aware of the capabilities of the CPA to store credentials for ease of use in electronic transactions. Furthermore, when a CPA is opened while a transaction is occurring with the VTP, the VTP may be relegated to the background (e.g., becomes idle or non-active), which may cause the VTP to perform a time-out operation for security purposes, resetting the application and forcing the user to restart the electronic transaction.

Thus, examples described herein determine whether a VTP is compatible with a CPA and provide a prompt for input of credential information for provisioning when the VTP is determined to be compatible with the CPA. The prompt may also be provided in response to identifying that no previously provisioned credentials are associated with the electronic device. The prompt may be provided as an overlay screen to the VTP, or may take other forms such that the user of the electronic device is prompted to enter new credential information while in the CPA. The provisioning may occur while the VTP remains active, thus permitting storage of a newly provisioned credential through the CPA in a uniform process and preventing the VTP from performing a time-out operation.

In some instances, the prompts may be provided even when the VTP is determined to be incompatible with the CPA, or when previously provisioned payment information is identified on the electronic device. Once the credential is provisioned, the CPA stores the credential on the electronic device and/or in an external Card on File (CoF) storage that is accessible by the electronic device for use in subsequent electronic transactions.

The credential that is newly provisioned may be submitted as a payment instrument for an in-process electronic transaction, thereby completing the electronic transaction. Furthermore, the VTP need not be compatible with a financial institution associated with the credential (e.g., the VTP may not accept a particular credit card as a particular form of payment). Also, the user of the electronic device may opt to input a credential for provisioning but may decide to utilize an alternative form of payment to complete the in-process electronic transaction. The CPA may store the provisioned credential for use in subsequent electronic transactions, however, regardless of when or whether the newly provisioned credential is utilized with the particular ongoing electronic transaction that prompted the credential input from the CPA during operation with the VTP.

These and other embodiments are discussed below with reference to FIGS. 1A to 6B; however, those skilled in the art will readily appreciate that the detailed description given herein with respect to these figures is for explanatory purposes only and should not be construed as limiting.

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) Long Term Evolution (LTE), LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

Figure 1A:
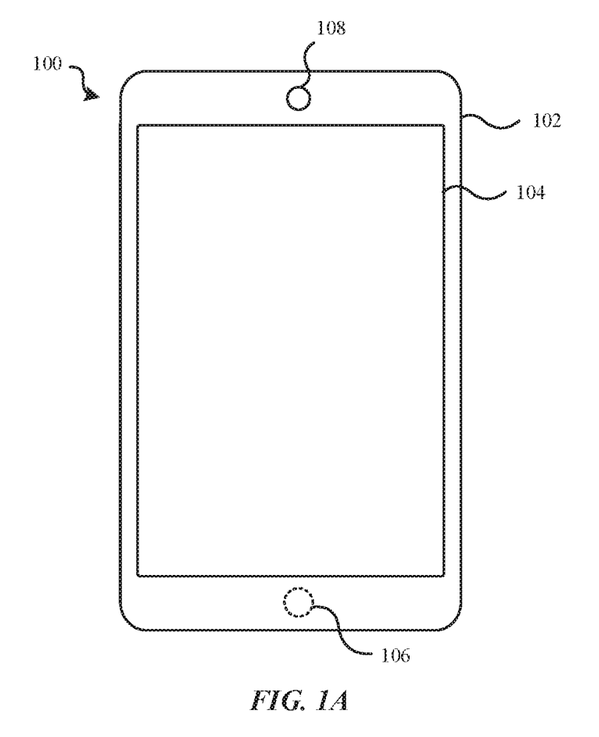
FIGS. 1A and 1B illustrate views of an exemplary electronic device.
Figure 1B:
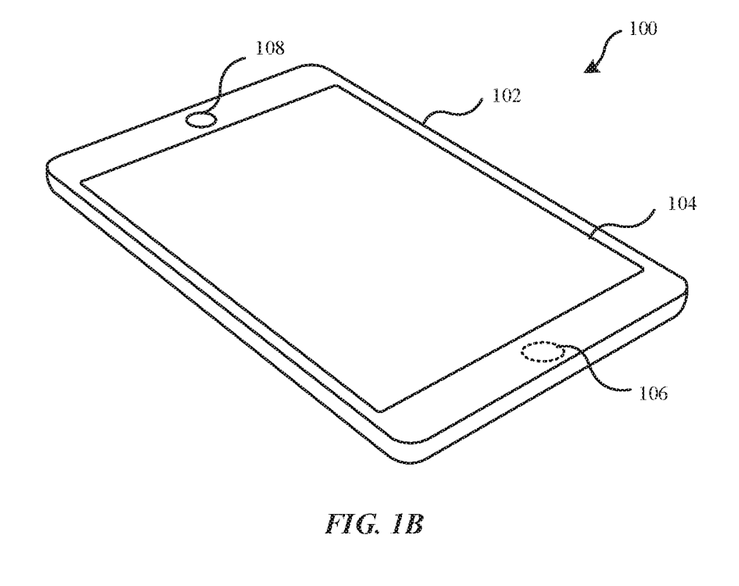

FIGS. 1A and 1B illustrate diagrammatic views of an exemplary electronic device 100 that may be used to conduct electronic transactions. Electronic device 100 can be a tablet computing device, for example, although other types and varieties of electronic devices can also apply for the various disclosed components and features disclosed herein. For example, the various embodiments disclosed herein could also be used with a smart phone, a media playback device, a personal digital assistant, a wearable device (e.g., a smart watch), a tablet, and/or a laptop computer, among other possible portable electronic devices. Portable electronic device 100 can include an outer housing 102, which can be adapted to hold a processor and other electronic components inside and can also provide space for an exterior touchscreen or other display 104, one or more buttons, such as home button 106 and a camera 108, among other possible device components. In some embodiments, the home button 106 may be virtual and may be optionally included with the electronic device 100. In embodiments where the device 100 is provided with a touch display or touch-screen, the display 104 may have touch capabilities well suited for receiving a touch event (and/or, in embodiments where the device 100 includes a haptic device, providing haptic feedback as a touch event), that can be used, for example, to control various operation of the electronic device when appropriately configured.

In one example, a transaction can be initiated on electronic device 100, e.g., through a web browser or an application. The transaction can include a purchase for which payment needs to be provided. When an electronic payment mechanism is selected, e.g., in association with an electronic wallet capability (or other payment application), a new credential can be provisioned, e.g., if a credential suitable for completing the transaction is unavailable. For example, the electronic wallet may not include any credential or the electronic wallet may not include a credential that is accepted by the other party to the transaction. Accordingly, as part of the transaction flow executed by electronic device 100, a new credential can be provisioned for use in completing the transaction, without disrupting the transaction. In some embodiments, one or more additional screens and/or windows can be presented in the transaction flow to facilitate provisioning of the new credential, with the transaction flow continuing after the information required to provision the credential has been captured.

Figure 2:
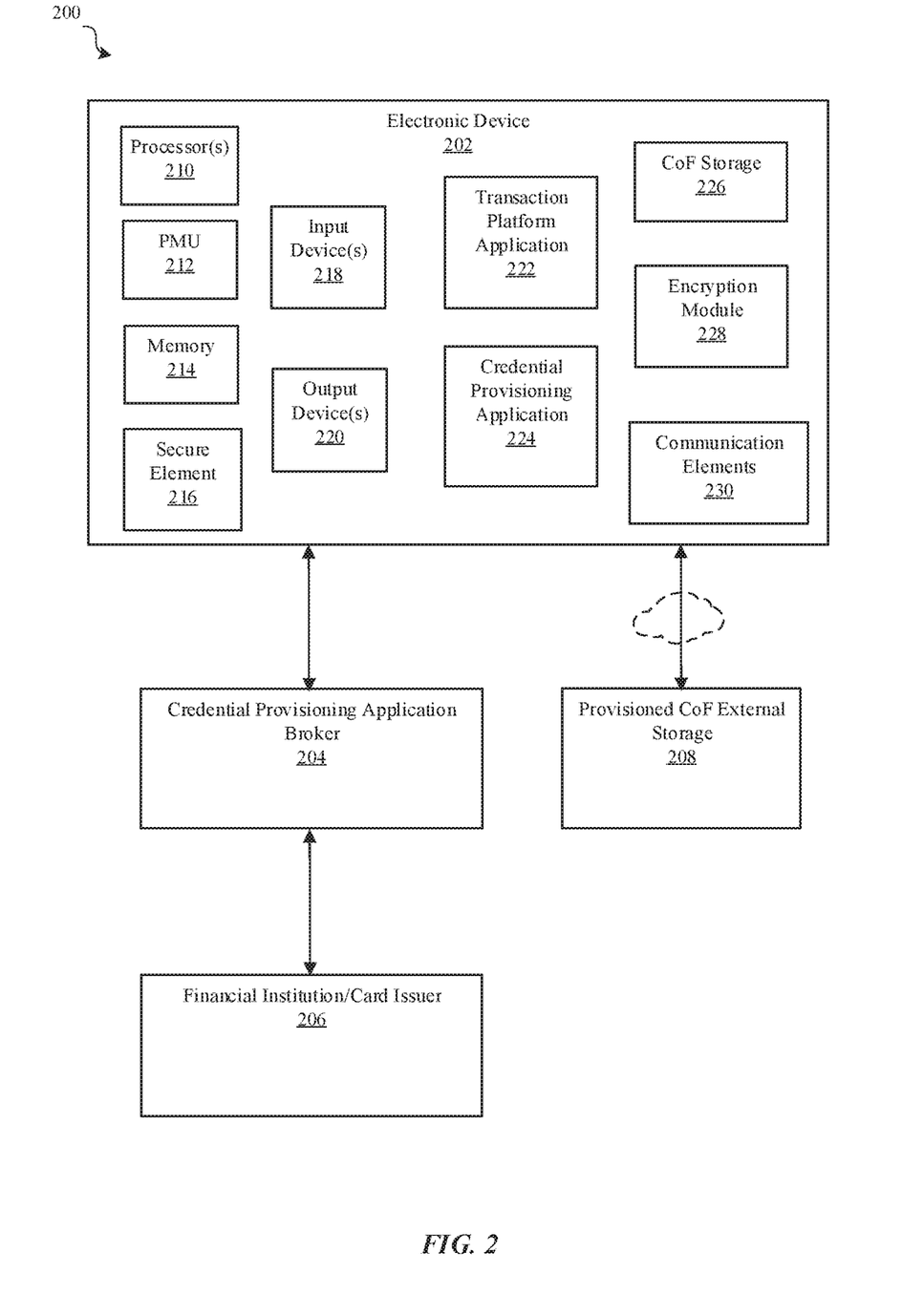
FIG. 2 illustrates a diagram of an exemplary system for conducting electronic transactions.

FIG. 2 illustrates a diagram of an exemplary system 200 for conducting electronic transactions. The system 200 includes an electronic device 202, a credential provisioning application (CPA) broker 204, a financial institution/card issuer 206, and a provisioned Card on File (CoF) external storage 208. The electronic device 202, the CPA broker 204, the financial institution/card issuer 206, and the provisioned CoF external storage 208 can communicate with each other, e.g., via internet connection(s) (as depicted). Those of skill in the art will understand other suitable communication arrangements between the components of system 200, as well as potential additional components may be used.

The electronic device 202 may include multiple internal components that, when operative together, conduct electronic transactions, among other capabilities. The internal components of the electronic device 202 include, for example, one or more processors, 210, a power management unit (PMU) 212, a memory 214 (e.g., a non-transitory computer readable storage medium), a secure element 216, input device(s) 218, output device(s) 220, a transaction platform application 222, a credential provisioning application (CPA) 224, a storage for cards on file (CoF) 226, an encryption module 228, and communication elements 230. The internal components of electronic device 202 shown in FIG. 2 are exemplary and not exclusive. Other suitable components for electronic devices will be understood by those of skill in the art.

The one or more processors 210 may also be referred to and/or as including control circuitry, a main processor, an applications processor, etc. The one or more processors 210 may be used to execute instructions (e.g., computer code) stored on the memory 214. The one or more processors 210 may control operation of the electronic device 202 and access storage such as memory 214, which may include hard-disk storage non-volatile memory (e.g., flash memory or other electrically-programmable-read-only memory forming a solid state drive), volatile memory (e.g., static or dynamic random access memory (SRAM/DRAM)), etc. Generally, the one or more processors 210 are utilized to run/operate software on the electronic device 202, such as internet browsing applications, voice-over-internet-protocol (VOIP) telephone call applications, email applications, media playback applications, operating system functions, etc. Such applications run by the one or more processors 210 may include a transaction platform application 222 and a credential provisioning application 224 installed or otherwise stored on the electronic device 202. The one or more processors 210 may be communicatively coupled to various components of the electronic device 202, such as the PMU 212, memory 214, secure element 216, input/output devices 218, 220, encryption module 228, communication elements 230, etc.

The PMU 212 may include, for example, a microcontroller that manages power functions for the electronic device 202. The PMU 212 may remain active (e.g., using a backup battery source) when other components of the electronic device 202 are idle or powered down. The PMU 212 is responsible for functions including but not limited to: monitoring power connections and battery charges, controlling power to other circuit components within the electronic device 202, shutting down unnecessary system components when they are left idle, controlling sleep and on/off power functions, and/or actively managing power consumption for optimum user performance, etc.

The electronic device 202 may also include a secure element 216. The secure element 216 may include a tamper-resistant component (e.g., as a single chip or multichip secure microcontroller) that securely hosts applications as well as confidential and/or cryptographic data for conducting electronic transactions. In some embodiments, the secure element 216 may be provided as a universal integrated circuit card (UICC), an embedded SE, a smart secure digital (SD) card, a microSD card, etc. Sensitive user information such as credit card information and other commerce credentials may be stored on the secure element 216. The secure element 216 can provide a secure domain that protects user credentials and processes payment transactions in a trusted environment without compromising safety of the user's data. In general, each secure element 216 may include its own unique identifier sometimes referred to as a secure element identifier (SEID). No two secure elements use the same SEID, and the SEID cannot be altered. In some examples, provisioned credentials may be at least partially generated (e.g., provisioned) using properties of the secure element 216.

The electronic device 202 also includes one or more input devices 218 and one or more output devices 220, generally configured for accepting and inputting data (e.g., from a user, an accessory attachment, etc.) and for outputting/transmitting data (e.g., from the device, an accessory attachment, etc.). Input devices 218 and output devices 220 may include touch screens, displays with or without touch sensor capabilities, buttons, joysticks, click wheels, scrolling wheels, touch pads, key pads, keyboards, microphones, cameras, buttons, speakers, status indicators, light sources, audio jacks and other audio port components, digital data port devices, light sensors, motion sensors (accelerometers), capacitance sensors, proximity sensors, haptic sensors/feedback providers, etc.

The memory 214 may also include installed thereon a transaction platform application 222 (e.g., an application that provides the electronic device 202 access to a vendor transaction platform as described herein), a credential provisioning application 224 (e.g., an application that allows the electronic device to communicate with external system components for provisioning credential information in electronic transactions as described herein), and a CoF list 226 (e.g., a list of Cards on File that are stored on the electronic device 202 which have been provisioned or are otherwise accessible by the credential provisioning application 224 for use in electronic transactions). In some embodiments, the CoF list 226 is stored in one or more additional or alternative locations and/or devices, such as an external, cloud-based storage (e.g., storage 208), at a CPA broker 204, with the financial institution/card issuer, 206, and the like.

The encryption module 228 of the electronic device 202 may be used in conjunction with the processor 210, secure element 216, input and output devices 218 and 220, transaction platform application 222, and credential provisioning application 224 for encrypting data received by the electronic device 202 during or otherwise for use with an electronic transaction, thereby securing the data. The encryption module 228 may include circuitry for encoding data (e.g., input credentials) once input into the electronic device 202 for secured storage and transmission. The encryption module 228 may work in conjunction with the secure element 216 to execute scripts (e.g., personalization/perso scripts) received from a financial institution 206 to provision credentials.

As described above, the electronic device 202 may include communication elements 230. The communication elements 230 may include wireless communications circuitry, such as radio-frequency (RF) transceiver circuitry formed from one or more integrated circuits, power amplifier circuitry, low-noise input amplifiers, passive RF components, one or more antennas, transmission lines, and other circuitry for handling RF wireless signals, etc. The communication elements 230 may also include satellite navigation system circuitry such as a global positioning system (GPS). The communication elements 230 may be compatible with Wi-Fi, Bluetooth, NFC (near-field communication), and other wireless communication formats used for conducting electronic transactions and/or exchange of secured data.

Further information on electronic device components, such as processors, power management units, memory, secure elements, input devices, output devices, encryption modules, and communication elements can be found in commonly owned U.S. Pat. No. 9,299,072, entitled "APPARATUSES AND METHODS FOR OPERATING A PORTABLE ELECTRONIC DEVICE TO CONDUCT MOBILE PAYMENT TRANSACTIONS," the contents of which is incorporated by reference herein for all purposes.

The system 200 for conducting electronic transactions may also include a credential provisioning application broker 204 and a financial institution (or card issuer) 206. The CPA broker 204 may act as a host for the credential provisioning application and/or as a centralized hub that operates and facilitates provisioning requests made by the credential provisioning application. The financial institution or card issuer may include a company that provides a payment type for which a credential is sought (e.g., a credit card/debit card provider). The CPA broker 204 and the financial institution 206 may communicate with each other such that data is exchanged in response to a provisioning request sent by, for example, the credential provisioning application 224 of the electronic device 202 as described further herein with respect to FIG. 3. The system 200 may also include a provisioned CoF external storage 208 configured to store provisioned credential information externally from the electronic device 202.

Figure 3:
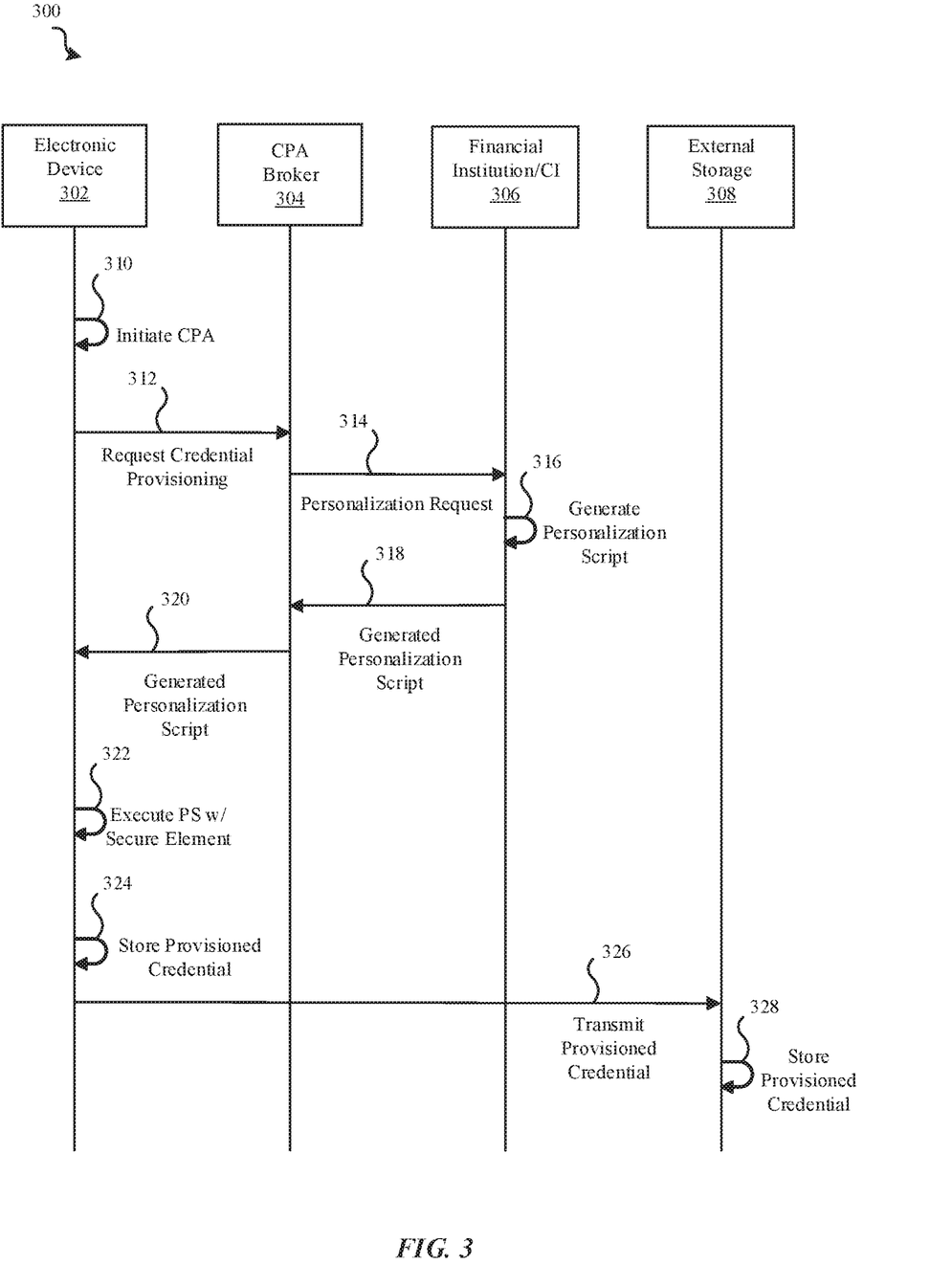
FIG. 3 illustrates a flow diagram of an exemplary electronic transaction process.

FIG. 3 illustrates a flow diagram 300 of an example of a data exchange for provisioning credentials that can be used in electronic transactions by electronic devices. The flow diagram 300 includes information transfers to and/or from an electronic device 302, a CPA broker 304, a financial institution or card issuer (CI) 306 and an external storage 308 (e.g., an external CoF storage). The embodiment shown in flow diagram 300 is exemplary and not exclusive, as additional steps or other suitable units may be utilized.

At 310, the credential provisioning application (CPA) is initiated (e.g., opened, activated, etc.) at the electronic device 302. In some implementations, the CPA may be an application into which a user of the electronic device 302 inputs payment information and/or credentials to be provisioned, such that the provisioned credential can be used to effect electronic payment. The CPA may be a single payment application configured to provision credentials (or at least initiate the provisioning process), store the provisioned credential, and submit electronic payments to a vendor for conducting and completing electronic transactions. In some examples, the CPA may be an application configured to receive credentials to be provisioned and facilitate the provisioned credentials to be stored in a separate electronic payment application (e.g., an electronic wallet) that can be used to effect or submit electronic payment for electronic transactions.

At 312, the electronic device 302 transmits a credential provisioning request to the CPA broker 304 (e.g., via the CPA initiated at 310). The credential provisioning request may include a request to provision one or more new credentials to the electronic device 302. In some implementations, the request may also include information identifying the credential to the CPA broker 304. The information identifying the credential, such as a credit card number, a debit card number, a prepaid card identifier, etc., may be encrypted prior to the request for provisioning being transmitted to the CPA broker 304.

At 314, the CPA broker 304 transmits a personalization request to the financial institution/CI 306. The personalization request may include a request for the financial institution to generate a personalization script (or perso script) for the identified credential to be provisioned. At 316, the financial institution 306 generates the personalization script for the credential. At 318, the generated personalization script is transmitted from the financial institution/CI 306 to the CPA broker 304. At 320, the CPA broker 304 transmits the generated personalization script to the electronic device 302.

At 322, the electronic device 302 executes the personalization script to provision the credential. In some embodiments, the electronic device 302 executes the personalization script using a secure operating system (OS) of the secure element to provision (or install) the credential. Once the credential has been provisioned (e.g., installed) on the secure element and is validated for use in one or more transactions, the provisioning process may be completed. In addition, in some implementations, the provisioned credential (or a representation thereof, including some or all of the associated credential information) may be stored at the electronic device 302 (e.g., in the CoF storage, locally on the secure element of the electronic device, etc.) at 324. Optionally, in some implementations, credential information may be transmitted to the external storage 308 at 326 (e.g., to a cloud account associated with a user) and/or stored in a CoF storage of the external storage 308 at 328.

Figure 4:
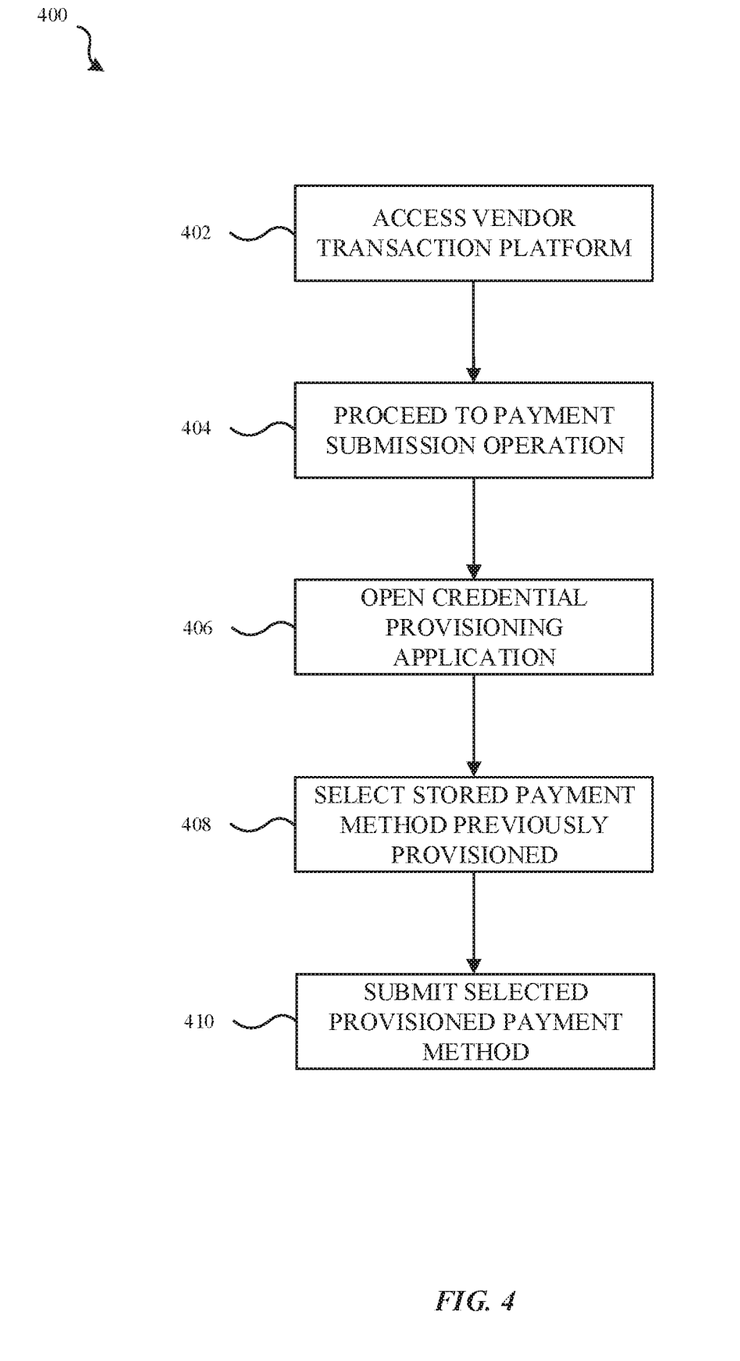
FIG. 4 illustrates a flowchart of an exemplary method for conducting an electronic transaction.

FIG. 4 illustrates a flowchart 400 of an example electronic transaction utilizing a credential provisioning application via an electronic device. At 402, a vendor transaction platform (VTP) is accessed by the electronic device. Further, in some embodiments, the VTP is accessed by a transaction platform application stored on the electronic device. The VTP may include a website activated through a browser on the electronic device, an independently operating application, and/or another form through which an electronic transaction may be performed.

At 404, the electronic transaction proceeds to a payment submission operation. Alternatively, an electronic transaction is near completion, and the VTP may inquire of a user of the electronic device for a form of payment to submit such that the electronic transaction can be completed. For example, during check-out, an option can be presented to select the form of payment for use in completing the transaction (e.g., credit/debit card, gift card, or electronic payment).

At 406, a credential provisioning application (e.g., an electronic wallet application configured to store one or more electronic credentials, an application configured for credential provisioning independently of the wallet application and provides provisioned credential information to the wallet application such that the wallet application can effect/submit electronic payment(s) in electronic transactions, and the like as described throughout this disclosure) is opened. The CPA may be compatible with the VTP, and in embodiments where the user of the electronic device has stored on it previously provisioned credentials, the CPA can be opened for completion of the transaction. In some implementations, the CPA (e.g., electronic wallet) can be accessed by the VTP (e.g., web-based payment or in-app payment) through an interface, such as an application program interface (API), to obtain credential information.

At 408, through the CPA, a stored payment method that is previously provisioned is selected for submission to the VTP for completion of the transaction. At 410, the selected provisioned payment method in the CPA is submitted to the VTP for completion of the electronic transaction.

A user of the electronic device, while accessing the VTP, may have not previously accessed the CPA to provision a credential. Due to security requirements, restrictions can be placed on whether and/or how consumer sensitive information is stored and may be reused for electronic transactions. As a result, users may commonly experience the need to manually input payment information through VTPs each time that the user wishes to complete payment for an electronic transaction. During an electronic transaction, the user may choose to use a CPA to make a payment. However, the user may not have previously provisioned a credential in the CPA. In the past, doing so may require initiation of the CPA, causing the VTP to close or to move to background operation. While provisioning a credential through the CPA, the VTP may perform a time-out operation due to lack of use and/or an elapsed amount of time while running in the background (e.g., the time-out operation may close the VTP application for security purposes). Other reasons also can arise, which would cause a payment transaction to terminate unsuccessfully. Additionally, the user of the electronic device may generally be unaware of or have not utilized the features of the CPA, and it may be advantageous to present a user with an opportunity to provision credentials with a CPA during an electronic transaction without resulting in the VTP performing the time-out operation.

Figure 5:
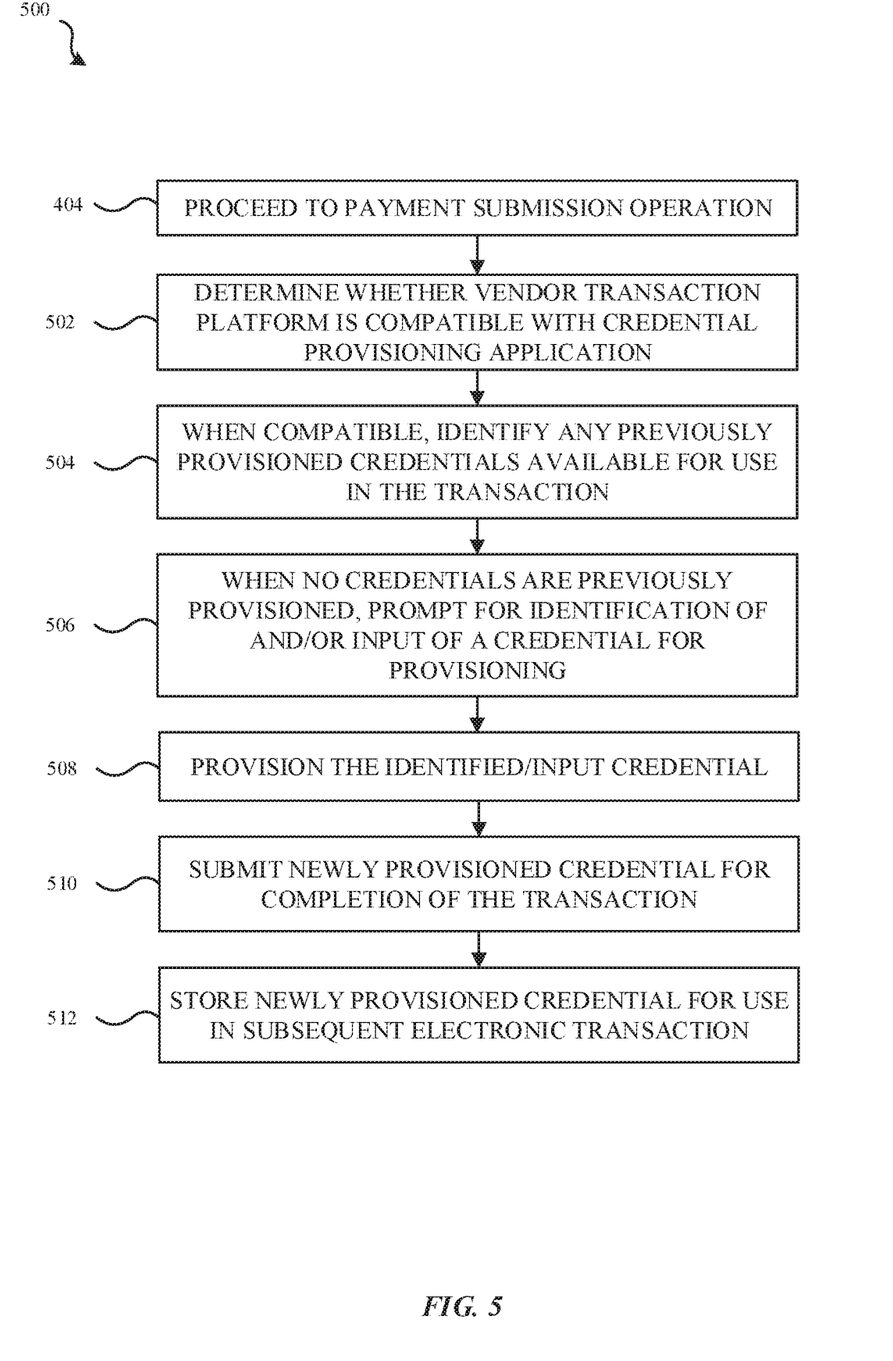
FIG. 5 illustrates a flowchart of an exemplary method for provisioning credentials while conducting an electronic transaction.
Figure 6A:
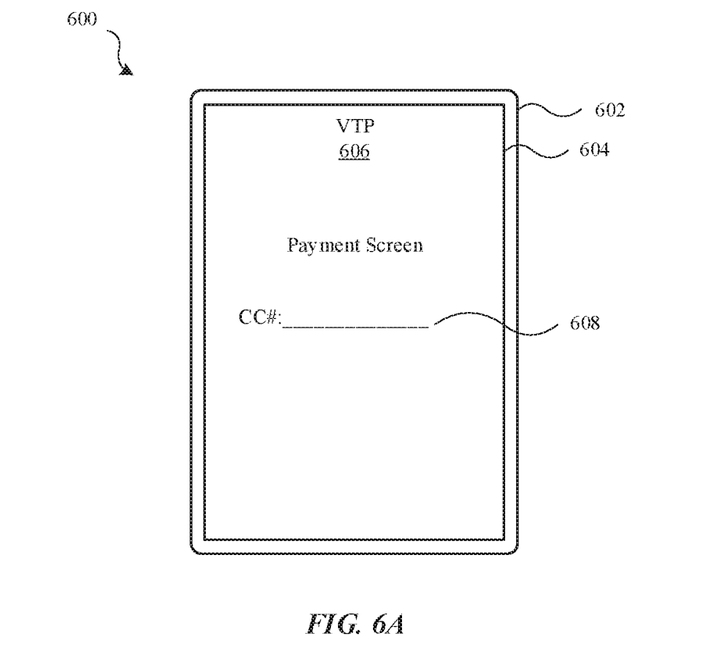
FIGS. 6A and 6B illustrate diagrams of exemplary electronic devices for displaying a vendor transaction platform and a credential provisioning application while conducting an electronic transaction.
Figure 6B:
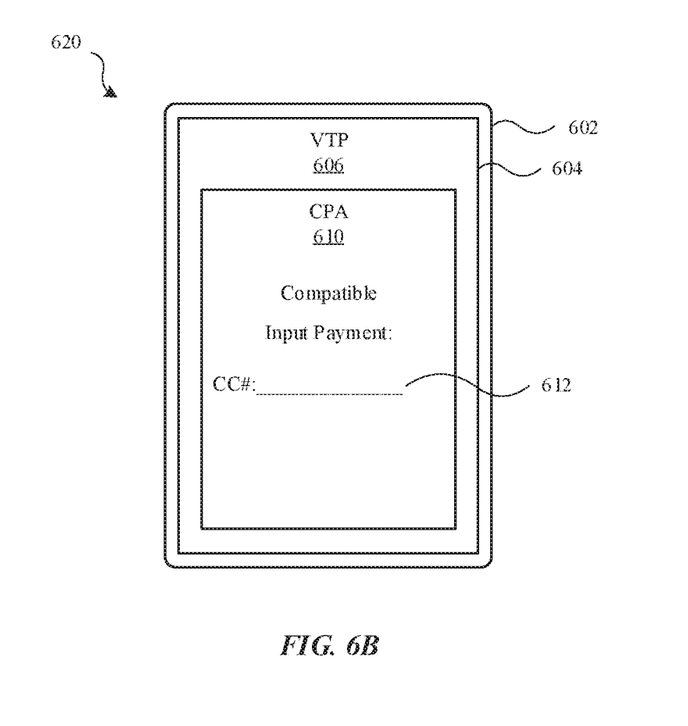

Referring next to FIGS. 5, 6A and 6B, exemplary methods, systems, and devices for provisioning credentials in electronic transactions are shown and described. FIG. 5 illustrates a flowchart 500 of an exemplary method for conducting an electronic transaction including provisioning of credentials. FIGS. 6A and 6B illustrate diagrams 600, 620 of examples for displaying information on an electronic device 602 during an electronic transaction.

At 404 in the flowchart 500 of FIG. 5, a user may be engaged with a VTP and conducting an electronic transaction, such that the user has proceeded to the payment submission operation, such as described for the flowchart 400 of FIG. 4.

The following describes example embodiments in which a credential suitable for completing the payment portion of the electronic transaction has not been provisioned in the CPA. For example, the CPA does not have any credentials provisioned or a credential accepted by the vendor has not been provisioned. For this scenario and other scenarios in which a user may advantageously benefit from using the CPA during the electronic transaction with the VTP, the method illustrated in FIG. 5 can apply.

At 502, it is determined whether the VTP is compatible with the CPA. For example, the electronic device may determine whether the VTP is compatible with the CPA. In some embodiments, the VTP can include an option, e.g., as part of the check-out, to permit selection of the CPA as the payment mechanism for the transaction. Additionally or alternatively, the VTP may include an indicator or other signal/tag readable by the electronic device to indicate to the electronic device that the VTP is compatible with a CPA installed/stored on the electronic device. In some embodiments, when the VTP is determined to not be compatible with the CPA, the method may proceed to submission of payment through the VTP without using provisioned payment information. In some embodiments, when the VTP is determined to not be compatible with the CPA, the method may proceed as though the CPA is compatible with the VTP. In such embodiments, newly provisioned credentials may be obtained and stored, although not utilized to complete the particular electronic transaction.

At 504, when the VTP and CPA are determined to be compatible (or as described previously in embodiments when they are not compatible but acquisition and storage of credentials still occurs), one or more previously provisioned credentials are identified that are available for use in the transaction, if any. For example, when the electronic device or the CPA includes credentials or payment information that has been previously provisioned through the CPA, such credentials can be identified. In some embodiments, when other stored credentials are identified, options may be presented on the electronic device to the user for selection to complete the electronic transaction through the VTP. Still in other examples, the method illustrated in flowchart 500 proceeds as though no provisioned credentials are identified, providing an opportunity for the user of the electronic device and the CPA to provision a new credential to be used in completing the particular electronic transaction, including scenarios in which the CPA includes previously provisioned credential information, such as, for example, when a previously provisioned credential is not accepted by the vendor.

At 506, a prompt for input of a credential for provisioning is provided when no credentials are previously provisioned, or, as discussed previously, when seeking to provision one or more new credentials for completion of the electronic transaction. In some embodiments, a user is prompted (e.g., by the device or via an output of the electronic device, such as by haptic feedback) to identify and/or input a credential for provisioning.

Examples of input/output mechanisms for prompting identification or input of a credential can be realized, in some embodiments, as illustrated in FIGS. 6A and/or 6B. As shown in the diagram 600 of FIG. 6A, an electronic device 602 may include a display 604 that displays a VTP 606, including displaying a VTP payment screen that requests payment input 608 (e.g., a credit card number). As disclosed with respect to steps 504 and 506, when the VTP 606 is determined to be compatible with the CPA, the device 602 may prompt the user to input a credential for provisioning. At illustrated in the diagram 620 of FIG. 6B, the electronic device 602 displays the VTP 606 via the display 604, but the CPA is detected/determined to be compatible with the VTP 606. In this example, the prompt may be in the form of a CPA overlay screen 610 that prompts for input (e.g., a credit card number entry 612) or identification of a credential. The prompt may be overlaid on top of the VTP display 606, such that the VTP program is still in current operation (e.g., the VTP application is still active in the foreground of the device), thereby preventing the VTP from engaging in, initiating, and/or performing a time-out operation. Therefore, the VTP application may continue to operate during the provisioning process of the CPA application such that the user of the electronic device 602 may easily return to the VTP application and finalize payment with a newly provisioned credential. Although the prompt in FIG. 6B is shown as an overlaid screen, the prompt may alternatively or additionally include any/all of haptic feedback, a separate screen not overlaid with the VTP application, an audible feedback response, a camera activation, and the like. As such, the credential information may be input manually by keyboard, by speech, or other way through an input device of the electronic device, such as a camera to photograph a physical card or other tangible form of payment. Other suitable prompts for input of a credential will be understood by those of skill in the art from the disclosure herein.

At 508, upon identification and/or input of the credential, a provisioning process initiates and is performed. The provisioning may occur such as the provisioning described with respect to FIG. 3, involving transmission, retrieval, encryption, and storage of credential information through a CPA broker, financial institution, electronic device, etc.

At 510, the newly provisioned credential is submitted for completion of the transaction. In some embodiments, the newly provisioned credential is submitted through the VTP application by the CPA for completion of the electronic transaction. Alternatively or additionally, an additional step of determining whether the credential is associated with an accepted form of payment for the VTP application is performed. For example, the input credential may be associated with a credit card issuer that is not accepted or not supported by the VTP application, even though the VTP application is compatible with the CPA. In such instances, the user may be prompted to input an additional form of payment to be provisioned, or may be prompted to proceed with completion of the electronic transaction through the VTP without submission of a payment instrument that is provisioned. Further, in some embodiments, upon provisioning of an accepted credential, the VTP can automatically continue the transaction flow using the newly provisioned credential. In some other embodiments, the newly provisioned credential can be selected, e.g., by a user, for completion of the in-progress transaction.

In some examples, the user may select one form of payment among multiple forms of payment to submit for completion of the transaction. Furthermore, multiple forms of payment may be used to complete the electronic transaction, where all are provisioned in the CPA, or one or more are provisioned and submitted through the CPA, while one or more others are submitted directly through the VTP. The systems, methods, and devices disclosed herein may advantageously provide a user with optimal flexibility for payment options to complete the electronic transactions in the VTP application fully, partially, or not at all with the CPA.

At 512, the newly provisioned credential is stored for use in one or more subsequent transactions. The subsequent transactions can be online, e.g., web-based or in-app based transactions, and/or in-person, e.g., with a point-of-sale terminal or another electronic device. In some embodiments, the newly provisioned credential and/or information associated therewith is stored in the electronic device and/or in an external CoF storage accessible by the electronic device. The CPA also may provide the option to store the newly provisioned credential in cases where the CPA is determined not to be compatible with the VTP, where the credential is associated with a financial institution/card issuer not accepted by the VTP, where the credential is provisioned but ultimately not used to complete the transaction, and/or where the provisioned credential is partially used to complete the electronic transaction.

Representative Embodiments

In some embodiments, a method of conducting an electronic transaction, by an electronic device that includes a processor and non-transitory computer readable storage medium storing a credential provisioning application, includes: (i) determining, during the electronic transaction, whether a vendor transaction platform being accessed by the electronic device is compatible with the credential provisioning application; (ii) prompting for identification of a credential, when the vendor transaction platform is determined to be compatible with the credential provisioning application; (iii) provisioning the identified credential via the credential provisioning application; (iv) completing the electronic transaction through the vendor transaction platform with the provisioned credential; and (v) storing the provisioned credential such that the stored credential is available to the credential provisioning application for use in a subsequent electronic transaction.

In some embodiments, the method further includes determining whether the electronic device includes a previously provisioned credential usable by the credential provisioning application, when the vendor transaction platform is determined to be compatible with the credential provisioning application. In some embodiments, the prompting, the provisioning, the completing, and the storing are performed when the electronic device does not include any provisioned credentials usable by the credential provisioning application. In some embodiments, the method further includes determining, after the provisioning, whether the vendor transaction platform supports the provisioned credential, where the provisioned credential is stored for use by the credential provisioning application in a subsequent electronic transaction when the provisioned credential is not supported by the vendor transaction platform. In some embodiments, the vendor transaction platform is compatible with the credential provisioning application when the vendor transaction platform accepts a credential associated with the credential provisioning application. In some embodiments, the provisioning further includes transmitting, by the credential provisioning application, a personalization request for the identified credential to a financial institution that issued the credential, and receiving a personalization script from the financial institution, the personalization script generated in response to the personalization request. In some embodiments, the method further includes encrypting the personalization script using a secure element of the electronic device and storing the encrypted personalization script on the electronic device as the provisioned credential. In some embodiments, the prompting further includes presenting multiple payment options that can be selected for identification of the credential.

In some embodiments, an electronic device configurable for conducting electronic transactions includes: (i) a processor; (ii) a non-transitory computer readable storage medium storing a credential provisioning application; and (iii) a communication element that facilitates exchange of data between the electronic device and external systems, where execution of instructions by the processor causes the electronic device to: access a vendor transaction platform to conduct an electronic transaction; activate, when the vendor transaction platform is compatible with the credential provisioning application, the credential provisioning application while the vendor transaction platform is being accessed; prompt for input of a credential to be provisioned by the credential provisioning application; initiate provisioning with the credential provisioning application of the credential input in response to the prompt; receive a provisioned credential generated responsive to the input credential; and submit the provisioned credential to the vendor transaction platform to complete the electronic transaction.

In some embodiments, execution of the instructions by the processor further causes the electronic device to store the provisioned credential for use in a subsequent electronic transaction. In some embodiments, the provisioned credential is stored without requiring completion of the electronic transaction. In some embodiments, the electronic device prompts for input of the credential when the electronic device does not include a previously provisioned credential.

In some embodiments, the electronic device prompts for input of multiple credentials to be provisioned by the credential provisioning application. In some embodiments, the electronic device prompts for input of the credential by overlaying a credential input screen over an interface of the accessed vendor transaction platform. In some embodiments, the electronic device maintains access to the vendor transaction platform during activation and use of the credential provisioning application, preventing the vendor transaction platform from performing a time-out operation.

In some embodiments, a non-transitory computer readable storage medium is configured to store a credential provisioning application and instructions that, when executed by a processor included in an electronic device, cause the electronic device to carry out a method that includes: (i) accessing a vendor transaction platform; (ii) proceeding to a payment submission operation associated with the vendor transaction platform. (iii) overlaying an interface of the vendor transaction platform with a screen generated by the credential provisioning application when the credential provisioning application is compatible with the vendor transaction platform, the screen prompting for input of a credential for provisioning; (iv) initiating provisioning of the input credential; and (v) upon completion of the provisioning of the input credential, storing the provisioned credential for use in a subsequent electronic transaction.

In some embodiments, the method further includes completing the payment submission operation using the provisioned credential. In some embodiments, the initiating further includes: transmitting the input credential to a credential provisioning application broker; and receiving a personalization script associated with the input credential from the credential provisioning application broker. In some embodiments, the method further includes encrypting the received personalization script with a secure element of the electronic device. In some embodiments, the screen prompts for input of multiple credentials.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for performing payment operations, the method comprising, by a computing device:
   accessing a vendor transaction platform;
   receiving, from the vendor transaction platform, a request to perform a payment operation;
   determining that the computing device lacks possession of at least one payment credential that is personalized to the computing device;
   executing a first process that prevents the vendor transaction platform from performing a time-out operation at least through performing the payment operation;
   executing a second process for generating a personalized payment credential, wherein the second process executes concurrently with the first process, and comprises:
      generating the personalized payment credential based at least on a personalization script that is unique to the computing device, wherein the personalization script is based on payment credential information received by the computing device;
   performing the payment operation with the vendor transaction platform using the personalized payment credential; and
   storing the personalized payment credential to be used for subsequent payment operations.

2. The method of claim 1, wherein:
   the first process is associated with a vendor transaction platform user interface,
   the second process is associated with a payment credential input user interface, and
   receiving the payment credential information comprises receiving an input of at least a credit card number through the payment credential input user interface.

3. The method of claim 2, wherein:
   the payment credential input user interface is overlaid onto the vendor transaction platform user interface so that the vendor transaction platform user interface remains active and prevents the vendor transaction platform from performing the time-out operation.

4. The method of claim 1, wherein the personalized payment credential is stored regardless of whether the vendor transaction platform accepts the personalized payment credential.

5. The method of claim 1, wherein the personalized payment credential is stored on the computing device locally or on a server computing device remotely.

6. The method of claim 1, wherein generating the personalized payment credential based at least on the payment credential information comprises:
   transmitting a personalization request for the payment credential information to a financial institution that issued a payment credential associated with the payment credential information; and
   receiving the personalization script from the financial institution, wherein the personalization script is based on the personalization request.

7. The method of claim 6, further comprising:
   encrypting the personalization script using a secure element of the computing device to produce an encrypted personalization script; and
   storing the encrypted personalization script to the computing device as the personalized payment credential.

8. The method of claim 1, further comprising, prior to completing the payment operation:
   receiving a second payment credential;
   provisioning the second payment credential to produce a second personalized payment credential; and
   storing the second payment credential to be used for subsequent payment operations.

9. A non-transitory computer readable storage medium configured to store instructions that, when executed by a processor included in a computing device, cause the computing device to perform payment operations, by carrying out steps that include:
   accessing a vendor transaction platform;
   receiving, from the vendor transaction platform, a request to perform a payment operation;
   determining that the computing device lacks possession of at least one payment credential that is personalized to the computing device;
   executing a first process that prevents the vendor transaction platform from performing a time-out operation at least through performing the payment operation;
   executing a second process for generating a personalized payment credential, wherein the second process executes concurrently with the first process, and comprises:
      generating the personalized payment credential based at least on a personalization script that is unique to the computing device, wherein the personalization script is based on payment credential information received by the computing device;
   performing the payment operation with the vendor transaction platform using the personalized payment credential; and
   storing the personalized payment credential to be used for subsequent payment operations.

10. The non-transitory computer readable storage medium of claim 9, wherein:
    the first process is associated with a vendor transaction platform user interface,
    the second process is associated with a payment credential input user interface, and
    receiving the payment credential information comprises receiving an input of at least a credit card number through the payment credential input user interface.

11. The non-transitory computer readable storage medium of claim 10, wherein the payment credential input user interface is overlaid onto the vendor transaction platform user interface so that the vendor transaction platform user interface remains active and prevents the vendor transaction platform from performing the time-out operation.

12. The non-transitory computer readable storage medium of claim 9, wherein the personalized payment credential is stored regardless of whether the vendor transaction platform accepts the personalized payment credential.

13. The non-transitory computer readable storage medium of claim 9, wherein the personalized payment credential is stored on the computing device locally or on a server computing device remotely.

14. The non-transitory computer readable storage medium of claim 9, wherein generating the personalized payment credential based at least on the payment credential information comprises:
    transmitting a personalization request for the payment credential information to a financial institution that issued a payment credential associated with the payment credential information; and receiving the personalization script from the financial institution, wherein the personalization script is based on the personalization request.

15. A computing device, comprising:
at least one processor; and
at least one memory storing instructions that, when executed by the at least one processor, cause the computing device to perform payment operations, by carrying out steps that include:
accessing a vendor transaction platform;
receiving, from the vendor transaction platform, a request to perform a payment operation;
determining that the computing device lacks possession of at least one payment credential that is personalized to the computing device;
executing a first process that prevents the vendor transaction platform from performing a time-out operation at least through performing the payment operation;
executing a second process for generating a personalized payment credential, wherein the second process executes concurrently with the first process, and comprises:
generating the personalized payment credential based at least on a personalization script that is unique to the computing device, wherein the personalization script is based on payment credential information received by the computing device;
performing the payment operation with the vendor transaction platform using the personalized payment credential; and
storing the personalized payment credential to be used for subsequent payment operations.

16. The computing device of claim 15, wherein:
the first process is associated with a vendor transaction platform user interface,
the second process is associated with a payment credential input user interface, and
receiving the payment credential information comprises receiving an input of at least a credit card number through the payment credential input user interface.

17. The computing device of claim 16, the payment credential input user interface is overlaid onto the vendor transaction platform user interface so that the vendor transaction platform user interface remains active and prevents the vendor transaction platform from performing the time-out operation.

18. The computing device of claim 15, wherein the personalized payment credential is stored regardless of whether the vendor transaction platform accepts the personalized payment credential.

19. The computing device of claim 15, wherein the personalized payment credential is stored on the computing device locally or on a server computing device remotely.

20. The computing device of claim 15, wherein generating the personalized payment credential based at least on the payment credential information comprises:
transmitting a personalization request for the payment credential information to a financial institution that issued a payment credential associated with the payment credential information; and
receiving the personalization script from the financial institution, wherein the personalization script is based on the personalization request.

* * * * *